United States Patent [19]
Verweij

[11] 3,852,281
[45] Dec. 3, 1974

[54] PROCESS FOR THE PREPARATION OF 7-SUBSTITUTED AMINO-DESACETOXYCEPHALOSPORANIC ACID COMPOUNDS

[75] Inventor: Jan Verweij, Leiden, Netherlands

[73] Assignee: Koninklijke Nederlandsche Gis-En Spritus-Fabriek N.V., Delft, Netherlands

[22] Filed: Feb. 16, 1971

[21] Appl. No.: 115,883

[30] Foreign Application Priority Data
Feb. 18, 1970   Great Britain ..................... 7892/70
July 23, 1970   Great Britain ................... 35796/70

[52] U.S. Cl............ 260/243 C, 260/239.1, 424/271, 424/246
[51] Int. Cl. ..................... C07d 99/16, C07d 99/24
[58] Field of Search ................................ 260/243 C

[56] References Cited
UNITED STATES PATENTS

| | | | |
|---|---|---|---|
| 3,275,626 | 9/1966 | Morin et al. ..................... | 260/239.1 |
| 3,591,585 | 7/1971 | Hatfield ........................... | 260/239.1 |
| 3,632,850 | 1/1972 | Garbrecht ........................ | 260/239.1 |
| 3,725,397 | 4/1973 | Graham .......................... | 260/243 C |
| 3,725,399 | 4/1973 | Ellerton et al. ................. | 260/243 C |

*Primary Examiner*—Nicholas S. Rizzo
*Attorney, Agent, or Firm*—Hammond & Littell

[57] ABSTRACT

Novel process for the preparation of 7-substituted amino-desacetoxycephalosporanic acids compounds by heating the corresponding 6-substituted aminopenicillanic sulfoxide compound in the presence of at least 5 moles of a nitrogen base per mole of sulfoxide compound and a silyl compound having a silicon-halide bond and to novel intermediates.

18 Claims, No Drawings

PROCESS FOR THE PREPARATION OF 7-SUBSTITUTED AMINO-DESACETOXYCEPHALOSPORANIC ACID COMPOUNDS

STATE OF THE ART

U.S. Pat. No. 3,275,626 describes the preparation of 7-aminocepham derivatives by heating analogous 6-aminopenicillanic sulphoxide derivatives in solution to temperatures of about 80° to 175°C under acid conditions, which may be promoted by, for example, acetic anhydride, or p-toluenesulphonic acid. This process involving heating under acid conditions results in a rearrangement of the heterocyclic ring structure leading to the formation among others of a thiazine ring which is a structural part of cephalosporin compounds. Several of these cephalosporin compounds possess useful antibiotic activity and are, therefore, very important as therapeutics.

On the other hand, it has been disclosed by Morin et al. [J. A. C. S., vol 91 (1969) p 1401–7]that heating esters of 6-aminopenicillanic sulphoxide derivatives such such as the cyanomethyl and methyl esters of phenoxymethylpenicillin sulphoxide in the presence of bases such as triethylamine and pyridine causes fission of the bicyclic ring system and results in the formation of isothiazolone derivatives.

OBJECTS OF THE INVENTION

It is an object of the invention to provide a novel process for the preparation of 7-substituted amino-desacetoxycephalosporanic compounds from the corresponding 6-substituted aminopenicillanic acid compounds.

It is a further object of the invention to provide novel silyl esters of 6-amino-penicillanic sulphoxides.

These and other objects and advantages of the invention will become obvious from the following detailed description.

THE INVENTION

The novel process of the invention of 7-substituted amino-desacetoxycephalosporanic acid compound comprises heating a 6-substituted amino-penicillanic sulfoxide up to 160°C under anhydrous conditions in the presence of a silicon compound having a silicon-halogen bond and at least 5 moles of a nitrogen containing organic base per mole of penicillanic sulfoxide to obtain the correspnding 7-substituted aminocephalosporanic compound.

The invention thus provides a new process for the preparation of 7-substituted amino-desacetoxycephalosporanic derivatives from 6-substituted amino-penicillanic sulphoxides in the form of acids or derivatives thereof, including thiocarboxylic acids, salts, esters and amides, by rearrangement of the sulphoxides by heating under anhydrous conditions in the presence of at least one nitrogen-containing organic base and a silicon compound having a silicon-halogen bond, at least five moles of base being present for each mole of penicillanic sulphoxide, optionally in an inert organic solvent. Preferably the nitrogen containing organic compound has a secondary or tertiary nitrogen atom and a pKa value of 4 to 10 (measured in water at 25°C).

The new process may be applied generally to 6-substituted aminopenicillanic sulphoxides of the formula

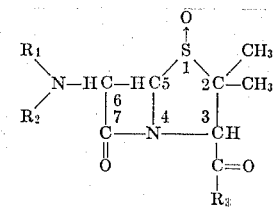

to yield 7-substituted-amino-desacetoxycephalosporanic derivatives of the formula

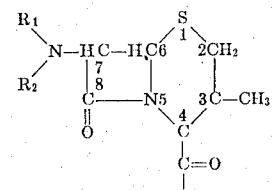

wherein $R_1$ is a group linked to the nitrogen atom by a carbon or sulphur atom, $R_2$ is hydrogen or a lower alkyl or phenyl (lower) alkyl group, or $R_1$ and $R_2$ together with the nitrogen atom to which they are attached represent a heterocyclic group, such as succinimido, phthalimido, oxazolidinyl or imidazolidinyl group, which may have one or more substituents, and $R_3$ is(a) a radical linked to the carbon atom by nitrogen with the nitrogen atom having attached to it atoms or groups selected from hydrogen, lower alkyl radicals, aryl (e.g., phenyl or naphthyl), sulfonyl and carbonyl groups, or two carbonyl groups, joined by an optionally substituted phenyl group

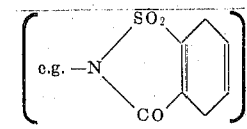

examples of such a nitrogen containing radical being primary amino, mono (lower)- alkylamino, di(lower-)alkylamino, anilino, saccharyl or succinimido, (b) a group —$SR_4$ wherein $R_4$ is hydrogen, a lower alkyl radical or phenyl; or (c) a group —$OR_5$ wherein $R_5$ is hydrogen or a suitable cation (e.g., an alkali metal or alkaline earth metal atom such as sodium, potassium or calcium, or a cation derived from an amine, such as triethylamine or cyclohexylamine), or $R_5$ is a lower alkyl radical (e.g., methyl, t-butyl or trichloroethyl), a cycloalkyl radical containing four to seven carbon atoms, phenyl, a phenylalkyl (e.g., benzyl), diphenyl-alkyl (e.g., benzhydryl) or aroyl-alkyl (e.g., phenacyl) group, the alkyl radicals of which contain one or two carbon atoms, or a stannyl group ($R_6R_7R_8$) $\equiv$ SN—[wherein $R_6$, $R_7$ and $R_8$ represent lower alkyl radicals, phenyl or a phenylalkyl group containing one or two carbon atoms, in the alkyl radical], or a silyl group ($R_9R_{10}R_{11}$) $\equiv$ Si-, wherein $R_9$, $R_{10}$ and $R_{11}$ each may be halogen atom, a lower alkyl radical, phenyl or a phenylalkyl group containing one or two carbon atoms in the alkyl radical, or one of $R_9$, $R_{10}$ and $R_{11}$ may be the group connected to $R_3$ in formula II and linked via oxygen to the silicon atom.

The aforementioned alkyl and aryl groups within the definitions of $R_2$ and $R_3$ may optionally carry substituents such as halogen atoms and in the case of aryl groups, lower alkyl, lower alkoxy or di(lower)alkylamino groups.

$R_1$ may be any group hitherto disclosed in relation to penicillins and cephalosporins, or analogous thereto and can therefore be for example, an alkanoyl group containing up to 20 carbon atoms, a phenyl (lower) alkanoyl, phenoxy (lower) alkanoyl, phenyl (lower) alkyloxycarbonyl, (lower) alkanoylaminocarbonyl, salicyl optionally substituted with one or two halogen atoms, phenoxyphenyl (lower) alkanoyl, isoxazolylcarbonyl, benzoyl, naphthoyl, formyl, oxazolidinyl, phenyl-α-amino (lower) alkanoyl, thienyl- or furyl-(lower)-alkanoyl, phenylthio (lower) alkanoyl, 2-benzofuranyl (lower)-alkanoyl, benzenesulfonyl or 1-piperidinosulfonyl group. The phenyl and heterocyclic radicals of such groups may have substituents as halogen atoms, and lower alkyl, carboxy, phenyl (lower) alkoxy, amino, nitro, cyano, trifluoromethyl and methylthio groups. $R_2$ may be, for example, a hydrogen atom or a methyl, ethyl, isobutyl or benzyl group. Moreover, $R_1$ and $R_2$ together with the nitrogen atom to which they are attached may form a heterocyclic (e.g., phthalimido) group.

Suitable groups represented by

in formulae I and II are benzyloxycarbamoyl, phenylacetamido, phenoxyacetamido, 3-acetylureido, (3,5-dichlorosalicyl)amino, 2-phenoxypropionamido, 2-phenoxybutyramido, 2-phenoxyphenylacetamido, 5-methyl-3-phenyl-4-isoxazolecarboxamido, 5-methyl-3-o-chlorophenyl)-4-isoxazolecarboxamido, 5-methyl-3-(2,6-di-chlorophenyl)-4-isoxazolecarboxamido, 2,6-dimethoxybenzamido, 2-ethoxy-1-naphthamido, 2-(o-aminobenzamido)-phenylacetamido-N-methyl, 2-(2-amino-5-nitrobenzamido)phenylacetamido-N-methyl, N- benzylformamido, N-methyl-2-phenoxyacetamido, N-methyl-2-phenylacetamido, N-ethyl-2-phenylacetamido,N-isobutyl-2-phenoxyacetamido, 2-benzylidene-4,5-dioxo-3-oxazolidinyl, 2-butylsuccinimido, 2,2-dimethyl-5-oxo-4-phenyl-1-imidazolidinyl, phthalimido, a(benzyloxycarbamoyl) phenylacetamido, 2-thienylacetamido, 3-thienylacetamido, 2-furylacetamido, 4-chlorophenyl-acetamido, 3-bromophenylacetamido, 3-nitrophenylacetamido, 4-nitrophenylacetamido, 3-trifluoromethyl-phenylacetamido, 4-cyanophenylacetamido, 4-methylthiophenylacetamido, 3-chlorophenylthioacetamido, 2-benzofuranylacetamido, benzenesulphonamido, p-bromobenzenesulphonamido, and 1-piperidinosulphonamido. Preferred groupings represented by $R_1R_2N-$ are phenylacetamido, phenoxyacetamido, α-amino-phenylacetamido and 2-ethoxynaphthamido.

When it is desired to obtain a desacetoxycephalosporanic derivative of general formula II in which $R_1R_2N-$ is α-aminophenylacetamido, the amino group of the corresponding 6-substituted aminopenicillanic sulphoxide starting material should be protected, during the ring enlargement by, for example, a benzyloxycarbonyl group, which can readily be removed subsequently to leave the free amino group. By the term "lower" as used herein with alkyl, alkoxy and alkanoyl groups is meant that the group in question contains at most 6, and preferably not more than four, carbon atoms.

The nitrogen-containing organic base present when the penicillanic sulphoxide derivative is heated is a secondary or tertiary aliphatic, cycloaliphatic, aromatic or heterocyclic amine, preferably having a pKa in water between 4 and 10. Examples of suitable bases are hexamethylenetetramine, N-methylaniline, dimethylaniline, pyridine and pyridine substituted with for example, one or more lower alkyl or mono- or di-(lower)alkylamino groups, such as the picolines, 2-ethyl-pyridine, 2-propylpyridine, 2,3-dimethylpyridine, 2,5-dimethylpyridine, 2,6-dimethylpyridine, collidines and 2-dimethylaminopyridine, or quinoline or 3-methylisoquinoline. Preferred bases are α-picoline, 2,5-dimethylpyridine, 2-dimethylaminopyridine and 3-methylisoquinoline.

The silicon-containing compound present in the reaction mixture is preferably a silicon-halogen compound of the general formula:

   III wherein $Y_1$, $Y_2$ and $Y_3$ each are a halogen atom (preferably chlorine), or an alkyl radical containing one to four carbon atoms, a phenyl or phenylalkyl group containing one or two carbon atoms in the alkyl radical, the said alkyl and phenyl groups optionally carrying substituents such as halogen atoms and, in the case of phenyl groups, alkyl, alkoxy or dialkylamino groups containing one to four carbon atoms in the alkyl or alkoxy radicals, with not more than two of $Y_1$, $Y_2$ and $Y_3$ being a halogen atom, and X is a halogen preferably chlorine) atom.

Examples of suitable silane compounds of formula III are trimethylchlorosilane, dimethyldichlorosilane, triethylchlorosilane, methyltrichlorosilane, trimethylbromosilane, trin-propyl-chlorosilane, triethylbromosilane, tri-n-propylbromosilane, bromomethyldimethylchlorosilane, tri-n-butylchlorosilane, methyldiethylchlorosilane, dimethylethylchlorosilane, phenyldimethylbromosilane, benzylmethylethylchlorosilane, phenylethylmethyl-chlorosilane, triphenylchlorosilane, tri-o-tolyl-chlorosilane and tri-p-dimethylaminophenyl-chlorosilane. Of the silicon compounds that are most widely used in chemistry, trimethylchlorosilane and dimethyldichlorosilane are preferred.

The process of the invention may be effected in an inert organic solvent medium. Suitable solvents are acetonitrile, chlorobenzene, dimethylformamide, acetonitrile, dioxane, nitrobenzene, anisole, benzene, carbon tetrachloride, and especially benzyl cyanide and halo alkanes such as 1,2-dichloroethane, 1,1-dichloroethane, 1-bromo-1-chloroethane, 1,2,3-trichloropropane and chloroform. The process can be carried out using the nitrogen-containing organic base (e.g., pyridine) itself as reaction medium. Good combinations of organic bases and solvents are α-picoline or 2,5-dimethylpyridine with benzyl cyanide or one of the above-mentioned halo alkanes such as 1,2-dichloroethane, 1-bromo-1-chloroethane or chloroform.

The process may be carried out at a temperature between 50° and 160°C and is advantageously carried out at a temperature between 60° and 130°C, and preferably within the range 70° to 100°C. The reaction temperature should be kept below 160°C to minimize the formation of decomposition products. Generally, the reaction temperature and reaction times are linked together to obtain good yields of the desacetoxycephalosporanic derivative; lower temperatures require longer reaction times and higher temperatures require shorter reaction times, e.g., at 70, 80° and 90°C, the reaction times may be 70 hours, 20–24 hours and 10 hours, respectively.

To obtain good yields of the desacetoxycephalosporanic derivative by the ring enlargement of the 6-substituted aminopenicillanic sulphoxides, a large molar excess of the nitrogen-containing organic base is preferably used, for example, 10 to 70 moles of base for each mole of sulphoxide is employed.

The amount of silicon compound in the reaction mixture may be from half a mole per mole of sulphoxide to a considerable molar excess. Preferably a molar excess of silicon compound is employed and this excess may range from 3 moles to 15 moles per mole of sulphoxide, the amount giving the best results varying according to the silicon compound and the solvent, if any, employed. By appropriate selection of organic base, silicon compound and solvent medium, yields as high as 75 percent of the theoretical yield of 7-amino-desacetoxycephalosporanic derivatives can be obtained from the penicillanic sulphoxide starting materials.

After completion of the ring enlargement reaction, the resulting reaction mixture may be treated to separate the 7-amino-desacetoxycephalosporanic derivative therefrom by any convenient method such as extraction, for example with ethyl acetate or chloroform, and/or crystallization. The 7-substituted amino-desacetoxy-cephalosporanic derivative so obtained (e.g., of general formula II) may, if desired, be converted by methods known per se into another desacetoxycephalosporanic derivative by appropriate modification of the 7-amino substituent and/or the substituent in the 4-position.

$R_3$ in the 6-substituted aminopenicillanic sulphoxide starting material of formula I is advantageously an $-OR'_5$ in which $R'_5$ is hydrogen or a suitable cation (e.g. sodium, potassium or calcium), or lower alkyl (e.g., trichloroethyl) or benzyl group, or a benzhydryl group optionally substituted in the benzene ring, (e.g., by one or more methoxy groups), preferably in the para-positions. The advantage arising when the 6-aminopenicillanic sulphoxide is in the form of free acid or salt lies in the fact that the process of the invention can then readily give a biologically active 7-amino-desacetoxycephalosporanic acid by carrying out just after the ring enlargement reaction a very easy and mild hydrolysis, thereby splitting off from the reaction product the silyl group which has esterified the carboxy group under the conditions of the ring enlargement reaction. When $R_3$ in the 6-substituted aminopenicillanic sulphoxide is a benzyloxy or benzhydryloxy group, the benzyl and benzyhydryl groups can be removed from the resulting desacetoxycephalosporanic esters (e.g., by hydrogenation or hydrolysis) without affecting the bicyclic heterocyclic ring system.

When a 6-aminopenicillanic sulphoxide of formula I is employed as starting material wherein $R_3$ is $OR_5'$ ($R_5'$ being as hereinbefore defined), the silicon-halogen compound, e.g., trimethylchlorosilane or dimethyldichlorosilane, present in the reaction mixture can silylate the carboxy group of the sulphoxide to form, for example, the novel 6-aminopenicillanic sulphoxide silyl esters of the general formula:

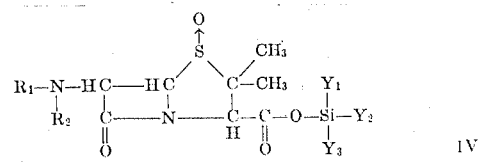

IV wherein the various symbols are as hereinbefore defined, or one of $Y_1$, $Y_2$ and $Y_3$ represents the 6-substituted amino-penicillanyl-carbonyloxy group attached to the silicon atom in formula IV. Such new silyl esters, for example the trimethylsilyl ester of benzylpenicillin sulphoxide, i.e., 6-phenyl-acetamidopenicillanic acid sulphoxide, dimethylchlorosilyl ester of benzylpenicillin sulphoxide, di (benzylpenicillin sulphoxide) dimethylsilyl ester, trimethylsilyl ester of phenoxymethylpenicillin sulphoxide, dimethylchlorosilyl ester of phenoxymethylpenicillin sulphoxide and di(phenoxymethylpenicillin sulphoxide) dimethylsilyl ester, are a part of the invention. The silyl group $-SiY_1Y_2Y_3$ can be easily split off from the final products by simple hydrolysis to yield the corresponding 7-substituted amino-desacetoxycephalosporanic acids.

The 6-aminopenicillanic sulphoxide derivatives of formula I used as starting materials in the process of the invention can be obtained by reaction of the corresponding 6-aminopenicillanic derivatives with an oxidizing agent by known methods. For this purpose the 6-aminopenicillanic derivative is treated with a substance affording active oxygen such as sodium periodate, a peracid, hydrogen peroxide or iodosobenzene, in a proportion sufficient to oxidize the thiazolidine sulphur atom to an $-SO-$ group. The initial compound can be the free acid, a salt, ester or amide thereof, suitably dissolved in a solvent which is inert under the reaction conditions used. The resulting sulphoxide can be readily recovered from the reaction mixture by methods known per se.

When the 6-aminopenicillanic derivative has a group which would also be affected by the oxidizing agent, it is possible to obtain the desired sulphoxide by starting with a 6-aminopenicillanic derivative that can be sulphoxidized without affecting an alternative group present thereon, and then to replace the unaffected group after sulphoxidation of the thiazolidine ring by the desired but more sensitive group. For example, a 6N-acylamido-penicillanic sulphoxide derivative obtained directly by sulphoxidation can be converted into another 6N-acyl-sulphoxide derivative with a more sensitive acyl group by deacylation in manner known per se leading to 6-amino-penicillanic acid sulphoxide, or salt, ester or amide thereof, followed by reacylation of the free 6-amino group with the appropriate acyl group by methods known per se. Alternatively, the required 6-aminopenicillanic sulphoxide derivative can be prepared by protecting in a suitable manner a labile group of the starting 6-aminopenicillanic acid derivative, followed by oxidation to the sulphoxide derivative and removal of the protecting group.

Deacylation of an N-acylamido group or the removal of a protecting group on the amino nitrogen atom of the 6-aminopenicillanic sulphoxide derivative is preferably effected after the ring enlargement reaction.

A preferred method is to start from an aminopenicillanic sulphoxide derivative, obtained from a penicillin which can easily be prepared by fermentation, such as benzylpenicillin or phenoxymethylpenicillin. After the ring enlargement to the corresponding desacetoxy-cephalosporanic derivative, its 7N-acyl group can be replaced by another desired one by deacylation and reacylation of the resulting amino group by methods known per se.

In the following examples there are described several preferred embodiments to illustrate the invention. However, it should be understood that the invention is not intended to be limited to the specific embodiments.

EXAMPLE 1

PREPARATION OF POTASSIUM SALT OF 7-PHENYLACETAMIDO-DESACETOXYCEPH-ALOSPORANIC ACID

Step A: Benzylpenicillin sulphoxide

A mixture of 75 g. (0.19 mol) of the potassium salt of benzylpenicillin, 1000 cc of water and 45.5 g (0.20 mol) of sodium metaperiodate was stirred for 2 hours at 25°C and after cooling the mixture to 0°C, the mixture was extracted at a pH of 1 with chloroform. The chloroform layer was concentrated to a volume of about 150 ml and 400 ml of diethyl ether were added. The precipitated benzylpenicillin sulphoxide was filtered off, washed with diethyl ether and dried under reduced pressure to obtain 64 g (90 percent yield) of benzylpenicillin sulfoxide having a decomposition temperature of 142.5° – 143.5°C.

Analysis of the PMR spectrum was as follows:
PMR (as a sodium salt in $D_2O$, values in ppm): $\delta$: 1.24 (s,3); 1.67 (s,3); 3.67 (s,2); 4.42 (s,1); 5.21(d,J = 4.5 Hz, 1); 5.94 (d, J = 4.5 Hz,1); 7.39 (s,5).

The sodium salt of 2,2-dimethyl-2-silapentyl-5-sulphonate was used as an internal standard.

STEP B. Potassium Salt of 7-phenylacetamido-desacetoxycephalosporanic acid 20 g. (0.057 mol) of benzylpenicillin sulphoxide, 14 cc (0.116 mol) of dimethyldichlorosilane and 112 cc (1.39 mol) of pyridine were dissolved in 280 cc of acetonitrile and the solution was stirred for one hour at room temperature to form a mixture of the benzylpenicillin sulphoxide dimethylchlorosilyl ester and the di (benzylpenicillinsulphoxide) dimethylsilyl ester in situ. The mixture was then heated at 70°C for 75 hours and the reaction mixture was then evaporated to dryness in vacuo. The residue was dissolved in a mixture of 400 cc of water and 400 cc of ethyl acetate and the pH was adjusted to 1.5 with hydrochloric acid. The ethyl acetate layer was removed, stirred with water and the pH was adjusted to 8 with a potassium hydroxide solution, and the aqueous layer was washed several times with ethyl acetate. After adjusting the pH of the aqueous solution to 3.3 with hydrochloric acid, the solution was extracted with ethyl acetate and the ethyl acetate layer was then extracted several times with water in order to remove unreacted benzyl-penicillin sulphoxide. The potassium salt of 7-phenylacetamido-desacetoxycephalosporanic acid was obtained from the ethyl acetate layer by stirring with water, adjustment of the pH to 7 with a potassium hydroxide solution, treatment of the aqueous layer with decolorizing charcoal and removal of the water by azeotropic distillation with n-butanol. The said product crystallized when the butanol solution was concentrated to obtain 4.15 g (0.011 mol) of the said product. The mother liquor contained more of the final product.

The structure was confirmed by IR and PMR spectra. The analysis of the PMR spectrum was as follows: PMR (as the potassium salt in $D_2O$, values in ppm): $\delta$: 1.93 (s,3); 3.15 (d, J = 18 Hz, 1); 3.50 (d, J = 18 Hz,1); 3.67 (s,2); 5.04 (d, J=4.5 Hz, 1); 5.61 (d, J = 4.5 Hz, 1); 7.41 (s,5).

The sodium salt of 2,2-dimethyl-2-silapentyl-5-sulphonate was used as an internal standard.

EXAMPLE 2

PREPARATION OF THE POTASSIUM SALT OF 7-PHENYLACETAMIDO-DESACETOXYCEPH-ALOSPORANIC ACID

A mixture of 20 g. (0.057 mol) of benzylpenicillin sulphoxide, 43 cc (0.34 mol) of trimethylchlorosilane, 112 cc (1.39 mol) of pyridine and 280 cc of acetonitrile was heated at a temperature of 85°C for 20 hours and then the reaction mixture was evaporated to dryness under reduced pressure. The residue was dissolved in a mixture of 200 cc of water and 200 cc of ethyl acetate and the pH was adjusted to 1.5 with hydrochloric acid. The ethyl acetate layer was removed, stirred with water and the pH was adjusted to 8 with a potassium hydroxide solution. The aqueous layer washed several times with ethyl acetate and after adjusting the pH of the aqueous solution to 3.3 with hydrochloric acid, it was extracted with ethyl acetate. The ethyl acetate layer was then extracted several times with water in order to remove unreacted benzylpenicillin sulphoxide and from the ethyl acetate layer, the potassium salt of 7-phenylacetamidodesacetoxy-cephalosporanic acid was obtained by stirring with water, adjustment of the pH of 7 with a potassium hydroxide solution, treatment of the aqueous layer with decolorizing charcoal and removal of the water by azeotropic distillation with n-butanol. The product crystallized when the butanol solution was concentrated to obtain 2.7 g (0.005 mol) of the said product and the mother liquor contained more of the final product. The structure of the product was confirmed by IR and PMR spectra.

EXAMPLE 3

PREPARATION OF THE POTASSIUM SALT OF 7-PHENYLACETAMIDO-DESACETOXYCEPH-ALOSPORANIC ACID 2.5 g (0.0075 mol) of benzylpenicillin sulphoxide, 1.7 cc (0.014 mol) of dimethyldichlorosilane and 24 cc (0.19 mol) of dimethylaniline were dissolved in 35 cc of chlorobenzene, and the mixture was heated at 85°C.

for 8 hours. The reaction mixture was evaporated to dryness in vacuo, and the residue was dissolved in a mixture of 50 cc of water and 50 cc of ethyl acetate and the pH was adjusted to 1.5 with hydrochloric acid. The ethyl acetate layer was removed, stirred with water and the pH was adjusted to 8 with a potassium hydroxide solution. The aqueous layer was washed several times with ethyl acetate and after adjustment of the pH of the aqueous solution to 3.3 with hydrochloric acid, it was extracted with ethyl acetate. The ethyl acetate layer was then extracted several times with water to remove unreacted benzylpenicillin sulphoxide and the potassium salt of 7-phenylacetamido-desacetoxycephalosporanic acid was obtained from the ethyl acetate layer by stirring with water, adjustment of the pH to 7 with a potassium hydroxide solution, treatment of the aqueous layer with decolorizing charcoal and removal of the water by azeotropic distillation with n-butanol. The potassium salt of 7-phenylacetamido-desacetoxycephalosporanic acid was filtered off and the structure was confirmed by the NMR spectrum.

EXAMPLE 4

PREPARATION OF THE BENZYL ESTER OF 7-PHENYLACETAMIDO-DESACETOXYCEPHALOSPORANIC ACID

A solution of 4.4 g (0.01 mol) of the benzyl ester of benzylpenicillin sulphoxide, 17 cc (0.21 mol) of pyridine, 3.0 cc (0.025 mol) of dimethyl-dichlorosilane and 50 cc of acetonitrile was heated for 16 hours in a water bath maintained at a temperature of 80°C. The reaction mixture was then concentrated under reduced pressure and the residue obtained was taken up in ethyl acetate. The resulting solution was washed with 1N hydrochloric acid and water, and evaporated to dryness.

According to thin layer chromatography, the residue consisted of the starting compound an apolar product. The residue was dissolved in chloroform and addition of diethyl ether caused the starting compound to precipitate out and it was filtered off. After addition of more diethyl ether, another compound was precipitated, which according to the PMR and the UV spectra, was the benzyl ester of 7-phenylacetamido-desacetoxycephalosporanic acid.

The analysis of the PMR spectrum was as follows:
PMR (in CDCl$_3$, values in ppm): δ : 2.10 (s,3); 3.20 (d, J = 18 Hz, 1); 3.40 (d, J = 18 Hz, 1); 3.63 (s,2); 4.93 (d, j = 5 Hz, 1); 5.28 (s,2); 5.78 (q, J = 5 and 9.5 Hz, 1); 6.63 (d, J = 9.5 Hz, 1); 7.35 (3,5); 7.41 (s, 5).

Tetramethylsilane was used as an internal standard.

The data are in accordance with those of a reference compound prepared by reacting 7-phenyl-acetamido-desacetoxycephalosporanic acid with benzyl bromide in dimethylformamide as solvent.

EXAMPLE 5

PREPARATION OF THE POTASSIUM SALT OF 7-PHENYLACETAMIDO-DESACETOXYCEPHALOSPORANIC ACID

STEP A: Trimethylsilyl ester of 6-phenylacetamidopenicillanic acid sulphoxide.

A solution of 1 cc (7.2 mol) of triethylamine in 10 cc of carbon tetrachloride was added rapidly to a suspension of 2.5 g (7.15 mmol) of benzyl-penicillin sulphoxide in 30 cc of dry tetrachloromethane. After stirring for 15 minutes, a solution of 1 cc (7.9 mmol) of trimethylchlorosilane in 10 cc of tetrachloromethane was added slowly at room temperature and after further stirring for 90 minutes at room temperature, the reaction mixture was concentrated to a volume of about 20 cc and filtered. The precipitate containing triethylamine hydrochloride was washed three times with dry tetrachloromethane and from the combined filtered tetrachloromethane solutions, a PMR spectrum was recorded. The analysis of this spectrum was as follows:
PMR (in tetrachloromethane, values in ppm): δ : 0.32 (s, 9); 1.13 (s,3); 1.63 (s,3;) 3.53 (s, 2); 4.54 (s,1); 4.95 (d, 1, J = 5 Hz); 5.90 (q. 1, J = 5 Hz and 11 Hz); 7.27 (d, 1, J = 11 Hz); 7.30 (s,5).

Tetramethylsilane was used as an internal standard. By totally evaporating the filtrate to dryness, the trimethylsilyl ester of 6-phenyl-acetamidopenicillanic sulphoxide was obtained in an amorphous state.

STEP B: Potassium salt of 7-phenyl-acetamido-desacetoxycephalosporanic acid.

A mixture of 1.22 g (0.0029 mol) of the trimethylsilyl ester of benzylpenicillin sulphoxide, 6 cc (0.075 mol) of pyridine, 0.35 cc (0.0029 mol) of dimethyldichlorosilane and 14 cc of acetonitrile was heated at a temperature of 80°C for 16 hours. Then the reaction mixture was diluted with 13 cc of water and 37 cc of 2N hydrochloric acid and the pH was adjusted to 1.5. Using the procedure of Example 1, the potassium salt of 7-phenyl-acetamido-desacetoxycephalosporanic acid whose presence was detected by a bioautogram was obtained.

EXAMPLE 6

POTASSIUM SALT OF 7-PHENYLACETAMIDO-DESACETOXYCEPHALOSPORANIC ACID

A mixture composed of 2.5 g (0.0072 mol) of benzylpenicillin sulphoxide, 1.7 cc (0.014 mol) of dimethyldichlorosilane and 35 cc (0.43 mol) of pyridine was heated for 7 hours at a temperature of 85°C and then the reaction mixture was evaporated to dryness under reduced pressure. The residue was dissolved in a mixture of 50 cc of water and 50 cc of ethyl acetate and the pH was adjusted to 1.5 with hydrochloric acid. The ethyl acetate layer was removed, and the procedure of Example 1 was followed to obtain 130 mg of the potassium salt of 7-phenylacetamido-desacetoxycephalosporanic acid. The structure was confirmed by IR and PMR spectra.

EXAMPLE 7

PREPARATION OF THE POTASSIUM SALT OF 7-PHENYLACETAMIDO-DESACETOXYCEPHALOSPORANIC ACID 20. g (0.057 mol) of benzylpenicillin sulphoxide, 14 cc (0.116 mol) of dimethyldichlorosilane and 140 cc (1.40 mol) of a α-picoline were dissolved in 280 cc of 1,2-dichloroethane and the mixture was heated at 80°C for 24 hours to form a mixture of dimethylchlorosilyl ester of the sulfoxide and dimethylsilyl ester of the disulfoxide in situ. The reaction mixture was cooled to 0°C and was stirred with an aqueous phosphate buffer solution of pH 7. The pH of the mixture was then adjusted to 7.2 with a potassium hydroxide solution. The aqueous layer was separated, adjusted to a pH of 1.5 with 4N hydrochloric acid and extracted with ethyl acetate. The ethyl acetate layer was extracted with water having a pH of 7.2 and the water from the aqueous extract was removed by azeotropic distillation in vacuo with n-butanol. The final volume of the remaining solution was about 200 cc and after standing overnight at 0°C, 12.6 g of the potassium salt of 7-phenylacetamido-desacetoxycephalosporanic acid had precipitated therefrom. The product, as analyzed by NMR spectroscopy, contained 10–20 percent by weight of n-butanol.

EXAMPLE 8

PREPARATION OF THE POTASSIUM SALT OF 7-PHENOXYACETAMIDO-DESACETOXYCEPHALOSPORANIC ACID 2.6 g (0.0072 mol) of phenoxymethylpenicillin sulphoxide, 1.75 cc (0.014 mol) of dimethyldichlorosilane and 17.2 cc (0.17 mol) of α-picoline were dissolved in 35 cc of 1,2-dichloroethane, and the solution was stirred for one hour at room temperature to form a mixture of the dimethylchlorosilyl ester of phenoxymethylpenicillin sulphoxide and the dimethylsilyl ester of diphenoxymethylpenicillinsulphoxide in situ. The mixture was then heated at 80°C for 16 hours, then cooled to 0°C and was stirred with an aqueous phosphate buffer solution of pH 7. The pH of the mixture was then adjusted to 7.2 with a potassium hydroxide solution. The aqueous layer was separated, adjusted to a pH of 1.5 with 4N hydrochloric acid end extracted with ethyl acetate. The ethyl acetate layer was extracted with water of pH 7.2 and the water from the aqueous extract was removed by azeotropic distillation in vacuo with n-butanol. The final volume of the remaining solution was about 25 cc and after standing overnight at 0°C, 0.46 g of the potassium salt of 7-phenoxyacetamido-desacetoxycephalosporanic acid had precipitated. The structure was confirmed by IR and PMR spectra. The analysis of the PMR spectrum was as follows:

PMR (in $D_2O$ values in ppm):

$\delta$ : 2.00 (s,3); 3.05 (d, J = 18 Hz, 1); 3.52 (d, J = 18 Hz,1); 4.58 (s,2); 5.08 (d,J=4.5 Hz, 1); 5.71 (d, J=4.5 Hz, 1); 6.7 – 7.4 (m, 5).

The sodium salt of 2,2-dimethyl-2-silapentyl-5-sulphonate was used as an internal standard.

EXAMPLE 9

PREPARATION OF 7-(α-aminophenylacetamido)-desacetoxy-cephalosporanic acid

STEP A: 6-(α-benzyloxycarbonylphenylacetamido)-penicillanic acid sulphoxide.

483 mg. (1 mmol) of benzyloxycarbonyl-ampicillin or α-benzyloxycarbonyl-benzylpenicillin [J. Chem. Soc. 1962 II, p 1140] were dissolved in 5 cc of a 3 percent solution of sodium bicarbonate in water and a solution of 0.34 g (1.5 mmol) of periodic acid in 2.3 cc of water, the pH of which was brought to 5.5 with a 4N sodium hydroxide solution, was added. After stirring for 15 hours at room temperature, the formed sodium iodate precipitate was filtered off and washed with water. To the aqueous layer, 20 cc of ethyl acetate were added and the pH was adjusted to 2.0 with 4N hydrochloric acid. The ethyl acetate layer was separated and the aqueous layer was extracted twice with 10 cc of ethyl acetate. The combined ethyl acetate extracts were washed three times with 5 cc of water and dried on Drierite. After filtration, the ethyl acetate solution was concentrated to a volume of about 1 to 2 cc and diethyl ether was added until no more crystalline solid precipitated. The precipitate was filtered off and washed with diethyl ether to obtain 400 mg of benzyloxycarbonyl-ampicillin sulphoxide or 6(α-benzyloxy-carbamoylphenylacetamido)-penicillanic acid sulfoxide. The structure was confirmed by NMR analysis.

STEP B: Potassium Salt of 7-(α-benzyloxy-carbamoyl-phenylacetamido)-desacetoxycephalosporanic acid 2.6 g (0.0072 mol) of 6-(α-benzyloxycarbamoyl-phenyl acetamido)-penicillanic acid sulphoxide, 1.75 cc (0.014 mol) of dimethyldichlorosilane and 17.2 cc (0.17 mol) of α-picoline were dissolved in 35 cc of 1,2-dichloroethane and the mixture was heated at 80°C for 24 hours. The reaction mixture was then concentrated to dryness in vacuo. The residue was dissolved in a mixture of 400 cc of water and 100 cc of ethyl acetate and the pH was adjusted to 8.0 with a potassium hydroxide solution. The aqueous layer was separated, treated with decolorizing charcoal and extracted with ethyl acetate at pH 1.5. The ethyl acetate layer was stirred with water with a pH of 7.2. Water was removed from the aqueous extract by azeotropic distillation in vacuo with n-butanol and the final volume was 10 cc. After standing overnight at 0°C, 62 mg of the potassium salt of 7-(α-benzyloxycarbamoyl-phenyl-acetamido)-desacetoxycephalosporanic acid had precipitated from the solution. The structure was confirmed by IR and PMR spectra. The analysis of the PMR spectrum was as follows: PMR (in dimethylsulphoxide $-d_6$, values in ppm); $\delta$ = 1.94 (s,3); 2.95 (d, J = 18 Hz, 1) 3.33 (d, J = 18 Hz, 1); 4.82 (d, J = 5 Hz, 1); 5.06 (s, 2); 5.2 – 5.7 (m, 2); 7.30 (s, 10); 7.93 (d, J = 8 Hz, 1); 9.06 (d, J = 8 Hz, 1). Tetramethylsilane was used as an internal standard.

STEP C: 7-(α-aminophenylacetamido)-desacetoxycephalosporanic acid

A suspension of 2.0 g of a 30 percent palladium-barium carbonate catalyst in 25 cc of an aqueous phosphate buffer of pH 7.5 was stirred in a hydrogen atmosphere. After one hour, a suspension of 0.5 g of the potassium salt of 7-(α-benzyloxycarbamoylphenylacetamido)-desacetoxycephalosporanic acid in 20 cc of acetone was added and the mixture was stirred in the hydrogen atmosphere for 4 hours. The catalyst was removed by filtration. A thin layer chromatogram on silica gel of the filtrate developed with a mixture of butyl acetate, butanol, acetic acid, methanol and water (16 : 3 : 8 : 1 : 5) on an *Escherichia coli* innoculated agar plate treated with penicillinase showed one single biologically active spot which had exactly the same Rf value as an authentic sample of 7-(α-aminophenylacetamido)-desacetoxycephalosporanic acid.

EXAMPLE 10

PREPARATION OF THE POTASSIUM SALT OF 7-PHENYLACETAMIDO-DESACETOXYCEPHALOSPORANIC ACID

A mixture of 2.5 g (0.0071 mol) of benzylpenicillin sulphoxide, 35 cc of 1,2-dichloroethane, 1.75 cc (0.014 mol) of dimethyldichlorosilane and about 14 cc (0.174 mol) of a base specified below was heated at 80°C for 24 hours. The reaction mixture was cooled and treated with water. After adjusting the pH to 7.2 with a potassium hydroxide solution, the organic layer was extracted with a phosphate buffer solution of pH 7.2. The amount of the potassium salt of 7-phenylacetamido-desacetoxycephalosporanic acid in the combined aqueous layers was determined by a direct microbiological assay using *Escherichia coli* as the test microorganism and is expressed in the following table in mol percentages related to the quantity of starting material and according to the base employed:

| Base | mol percent |
|---|---|
| 2-dimethylaminopyridine | 49% |
| α-picoline | 47% |
| 3-methylisoquinoline | 47% |
| 2,5-dimethylpyridine | 46% |
| hexamethylenetetramine | 19% |

EXAMPLE 11

PREPARATION OF THE POTASSIUM SALT OF 7-PHENYLACETAMIDO DESACETOXYCEPHALOSPORANIC ACID

The process of Example 10 was repeated except that 35 cc of chloroform, 5.8 cc (0.0458 mol) of trimethylchlorosilane and 15.6 cc of N-methylaniline were used. The yield of the potassium salt of 7-phenylacetamido-desacetoxycephalosporanic acid was 13 percent as expressed in a mol percent.

EXAMPLE 12

PREPARATION OF THE POTASSIUM SALT OF 7-PHENYLACETAMIDO DESACETOXYCEPHALOSPORANID ACID

A mixture of 2.5 g (0.0071 mol) of benzylpenicillin sulphoxide, 2.5 cc (0.035 mol) of pyridine, 4.4 cc (0.035 mol) of trimethylchlorosilane and 40 cc of benzylcyanide was heated at 80°C for 24 hours and the yield of the potassium salt of 7-phenylacetamido-desacetoxycephalosporanic acid, determined by microbiological assay as in Exxample 10, was 10 percent.

EXAMPLE 13

PREPARATION OF THE POTASSIUM SALT OF 7-PHENYLACETAMIDO-DESACETOXYCEPHALOSPORANIC ACID

A mixture of 1.05 g (3 mmol) of benzylpenicillin sulphoxide, 14 cc of acetonitrile, 6 cc (0.074 mol) of pyridine and 0.5 g (2.8 mmol) of dichloromethyldimethyl chlorosilane was stirred at a temperature of 80°C for 16 hours. The mixture was then poured into a cold mixture of 75 cc of a 1 molar solution of hydrochloric acid and 25cc of ethyl acetate. The ethyl acetate layer was separated and the aqueous layer was extracted twice with 25 cc of ethyl acetate. The combined ethyl acetate layers were washed twice with 25 cc of water and the potassium salt of 7-phenylacetamido-desacetoxycephalosporanic acid was obtained from the ethyl acetate solution by stirring with water, adjusting the pH to 7 with a potassium hydroxide solution, treatment of the aqueous layer with charcoal and removal of the water by azeotropic distillation with n-butanol. 130 mg (0.35 mmol) of the said potassium salt crystallized upon concentration.

EXAMPLE 14

PREPARATION OF THE POTASSIUM SALT OF 7-PHENYLACETAMIDODESACETOXYCEPHALOSPORANIC ACID

The procedure of Example 13 was repeated wtih 0.5 g (3.1 mmol) of methylpropyldichlorosilane instead of dichloromethyldimethylchlorosilane to obain 140 mg (0.38 mmol) of the potassium salt of 7-phenylacetamido-desacetoxycephalosporanic acid.

EXAMPLE 15

PREPARATION OF THE POTASSIUM SALT OF 7-PHENYLACETAMIDO-DESACETOXYCEPHALOSPORANIC ACID

The procedure of Example 13 was repeated with 0.6 cc (2.9 mmol) of diphenyldichlorosilane instead of dichloromethyldimethylchlorosilane to obtain 120 mg (0.32 mmol) of the potassium salt of 7-phenylacetamidodesacetoxycephalosporanic acid.

EXAMPLE 16

PREPARATION OF THE POTASSIUM SALT OF 7-PHENYLACETAMIDO-DESACETOXYCEPHALOSPORANIC ACID

A mixture of 90 g (0.257 mol) of benzyl-penicillin sulphoxide, 210 cc (1.66 mol) of trimethylchlorosilane, 900 cc (9 mol) of α-picoline and 900 cc of chloroform was heated for 20 hours at a temperature of 83°C and then the reaction mixture was cooled and stirred with water. The pH of the mixture was adjusted to 7.5 with a potassium hydroxide solution and the amount of the potassium salt of phenylacetamidodesacetoxycephalosporanic acid obtained was 55 mol percent as determined by microbiological assay using *Escherichia coli* as the test microorganisum.

The aqueous layer was seperated, adjusted to a pH of 1.5 with 4N hydrochloric acid and extracted with ethyl acetate. The ethyl acetate was then replaced with 925 cc of n-propanol and the propanol solution cooled to about 0°C. Addition of 3.5 cc of water and 100 cc of a 1.25 molar solution of the potassium salt of 2-ethylcaproic acid in butyl acetate gave a precipitate of the potassium salt of 7-phenylacetamidodesacetoxycephalosporanic acid in a yield of 57 g (0.15 mol) consisting of 78 percent of the potassium salt of $\Delta^3$-7-phenylacetamido-desacetoxycephalosporanic acid and about 12 percent of the potassium salt of $\Delta^2$-7-phenyl-acetamido-desacetoxycephalosporanic acid. The mother liquor contained more of the desacetoxy cephalosporanic derivatives. After separation of the $\Delta^3$-compound, the $\Delta^2$-compound can be converted into the $\Delta^3$-product by known methods.

EXAMPLE 17

PREPARATION OF THE POTASSIUM SALT OF 7-PHENOXYACETAMIDO-DESACETOXYCEPHALOSPORANIC ACID 1.3 g (0.036 mol) of phenoxymethylpenicillin sulphoxide, 1.4 cc (0.011 mol) of dimethyldichlorosilane and 13 cc (0.13 mol) of α-picoline were dissolved in 13 cc of chloroform and the mixture was heated at 80°C, for 24 hours. The reaction mixture was cooled and stirred with an aqueous phosphate buffer solution of pH 7. The pH was then adjusted to 7.2 with a potassium hydroxide solution. The aqueous layer was separated, adjusted to a pH of 1.5 with a hydrochloric acid solution and extracted with ethyl acetate. The ethyl acetate was then replaced by 16 cc of n-propanol and to the cooled solution was added 4 cc of a 1.25 molar solution of potassium 2-ethylcaproate in butyl acetate. After standing overnight at 0°C, 0.62 g (0.0016 mol) of the potassium salt of 7-phenoxyacetamidodesacetoxycephalosporanic acid had precipitated. Its structure was confirmed by IR and PMR spectra.

EXAMPLE 18

PREPARATION OF THE POTASSIUM SALT OF 7-PHENYLACETAMIDO-DESACETOXYCEPHALOSPORANIC ACID

A mixture of 2.5 g (0.0071 mol) of benzylpenicillin sulphoxide, 35 cc of a solvent as specified below, 14 cc (0.172 mol) of pyridine and 1.75 cc (0.014 mol) of dimethyldichlorosilane was heated at 80°C for 8 hours. The reaction was then terminated and the resulting reaction mixture was cooled and treated with water. After adjusting the pH to 7.2 with a potassium hydroxide solution, the organic layer was extracted with a phosphate buffer solution of pH 7.2. The amount of the potassium salt of 7-phenylacetamidodesacetoxycephalosporanic acid in the combined aqueous layers was determined by a microbiological assay using *Escherichia coli* as the testing microorganism and is expressed in the table hereafter in mol percentages related to the quantity of the starting material and according to the solvent employed.

| SOLVENT | YIELD |
|---------|-------|
| 1,2-dichloroethane | 20–22% |
| benzylcyanide | 20–22% |
| dimethylformamide | 16% |
| acetonitrile, dioxane, nitrobenzene, pyridine, anisole, ) ) | |
| | 13–16% |
| benzene, benzonitrile and carbon tetrachloride ) ) | |

EXAMPLE 19

PREPARATION OF 7-(2-ETHOXYNAPHTHAMIDO)-DESACETOXYCEPHALOSPORANIC ACID

A mixture of 2.6 g (6 mmol) of 2-ethoxynaphthylpenicillin sulphoxide, 20 cc of chloroform, 20 cc (200 mmol) of α-picoline and 4.8 cc (36 mol) of trimethylchlorosilane was refluxed for 16 hours and then the reaction mixture was poured into a cold mixture of 50 cc of water and 30 cc of chloroform. After adjusting the pH to 1.5 with a hydrochloric acid solution, the aqueous layer was extracted with 50 ml of chloroform and the combined chloroform extracts were washed with water and evaporated to dryness. The residue of 1.4 g. was analized by NMR using 2.6-dichloroacetophenone as an internal standard and it contained 21 percent of unchanged sulphoxide, 45 percent of the desired 7-(2-ethoxynaphthamido)-desacetoxycephalosporanic acid and 8 percent of the corresponding $\Delta^2$-compound.

EXAMPLE 20

PREPARATION OF 7-PHENYLACETAMIDODESACETOXYCEPHALOSPORANIC ACID

STEP A: SACCHARIMIDE OF BENZYLPENICILLIN SULPHOXIDE 17.6 g (50 mmol) of benzylpenicillin sulphoxide were dissolved in 750 cc of dichloromethane and 5 g. (50 mmol) of triethylamine and the solution was cooled to 3°C. 10.1g (50 mmol) of γ-saccharin chloride were added and the mixture was stirred for 30 minutes. After standing overnight in a refrigerator, the solution was washed twice with 350 cc of cold water, 500 cc of a pH 7 phosphate buffer, dried over sodium sulfate and evaporated to dryness at 40°C.

According to NMR analysis, the residue of 33.7 g was the saccharimide of benzylpenicillin sulphoxide.

STEP B:

A mixture of 5.2 g (10 mmol) of the saccharimide of benzylpenicillin sulphoxide, 40 cc of chloroform, 10 cc (102 mmol) of α-picoline and 1.1 cc (10 mmol) of dimethyldichlorosilane was heated at a temperature of 80°C for 16 hours, after which 60 cc of chloroform and 100 cc of water were added. The pH was adjusted to 1.5 with a hydrochloric acid solution and the organic layer was separated, washed with water and evaporated to dryness. The residue thus obtained was taken up in 60 cc of tetrahydrofuran and a solution of 4 g. of sodium bicarbonate in 60 cc of water was added to cause splitting of the saccharimide group. After stirring the mixture of 2 hours in a nitrogen atmosphere, 100 cc of water were added and the tetrahydrofuran was removed by evaporation. The remaining solution was adjusted to pH of 7 and was washed with ethyl acetate. The presence of 7-phenylacetamido-desacetoxycephalosporanic acid in the solution was detected by means of a bioautogram.

EXAMPLE 21

PREPARATION OF 7-PHENOXYACETAMIDO-DESACETOXYCEPHALOSPORANIC ACID OR PHENOXYMETHYLDESACETOXYCEPHALOSPORIN

A mixture of 36.6 g (0.1 mole) of phenoxymethylpenicillinsulphoxide, 360 cc (3.6 mole) of α-picoline and 81 cc (0.64 mole) of trimethylchlorosilane in 360 cc of chloroform was stirred at room temperature for 1 hour to form the trimethylsilylester of phenoxymethylpenicillinsulphoxide in situ. The mixture was heated at 80°C for 24 hours, and then was poured into water and the pH was adjusted to 7.9 by addition of a sodium hydroxide solution. The aqueous layer was washed with 500 cc of ethyl acetate, treated with charcoal and after filtration in the presence of 250 ml of ethylacetate the pH was adjusted to 1.5. The aqueous layer was again extracted with 250 cc of ethyl acetate and the ethyl acetate layers after washing with 500 cc of water were evaporated to dryness. The residue was triturated with ethyl acetate to obtain 8.31 g (25 percent) yield of phenoxymethyldesacetoxycephalosporin.

EXAMPLE 22
PREPARATION OF
6-(α-aminophenylacetamido)-penicillanic acid sulphoxide A mixture of 56 g. (0.16 mol) of benzylpenicillin sulphoxide, 500 cc of methylene chloride, 71.5 cc (0.57 mol) of dimethylaniline and 16 cc (0.13 mol) of dimethyldichlorosilane was stirred for 2 hours at room temperature and the reaction mixture was then cooled to −50°C. 36.g (0.17 mol) of phosphorus pentachloride were added and the mixture was stirred for 2.5 hours at a temperature of −30°C. The temperature was lowered to −70°C, and 250 cc (2.8 mol) of 2-butanol were added. Then, the mixture was stirred for 75 minutes at −40°C and to the solution 86 g (0.45 mol) of p-toluene—sulfonic acid monohydrate in 170 cc of methanol were added. The temperature was maintained at 0°C for 15 minutes and this led to the crystallization of 6-aminopenicillanic acid sulphoxide p-toluene — sulfonate. The precipitate was filtered off, washed with acetone and diethyl ether and dried under reduced pressure to obtain 43 g of the said product.

The analysis of the PMR spectrum was as follows:
PMR (in $CDCl_3$/dimethyl sulphoxide — $d_6$) δ : 1.27 (s,3); 1.67 (s, 3); 2.37 (s,3); 4.55 (s, 1); 5.23 (d, J = 5 Hz, 1); 5.35 (d, J = 5 Hz, 1); 7.1 − 7.9 (m,8)

Tetramethylsilane was used as an internal standard.

STEP B: 6-AMINOPENICILLANIC ACID SULPHOXIDE

A mixture composed of 1.0 g. (0.0025 mol) of 6-aminopenicillanic acid sulphoxide p-toluene-sulfonate, 0.34 cc (0.0025 mol) of triethylamine and 3 cc of an 85 percent solution of isopropanol was stirred for 30 minutes at 20°C and the precipitated 6-aminopenicillanic acid sulphoxide was filtered off, to obtain 552 mg (96 percent yield) of the said product having a decomposition temperature of 185°–187°C.

The analysis of the PMR spectrum was as follows:
PMR (as the sodium salt in $D_2O$);
δ : 1.29 (s,3); 1.69 (s,3); 4.39 (s,1); 4.89 (d,1, J= 4.5 Hz); 5.27 (d,1, J = 4.5 Hz).

The sodium salt of 2,2-dimethyl-2-silapentyl-5-sulphonate was used as internal standard.

STEP C: 6(α-aminophenylacetamido)penicillanic acid sulphoxide.

5.3 cc (0.044 mol) of dimethyldichlorosilane were added to a mixture of 5 g. (0.021 mol) of 6-aminopenicillanic acid sulphoxide, 5.9 cc (0.042 mol) of triethylamine, 3.1 cc (0.024 mol) of dimethylaniline and 65 cc of methylene chloride. After stirring at 25°C for 1 hour, the mixture was cooled to 16°C and 4.25 g of α-phenyl-glycyl chloride hydrochloride (0.021 mol) were added in portions over a period of 15 minutes. After stirring for 2.5 hours at 16°C, the reaction mixture was poured into 160 cc of ice-water. The aqueous layer was brought to a pH of 3.5 with triethylamine and 6 g (0.027 mol) of β-naphthalene sulphonic acid in water were added. The pH was brought to 2.0 with sulfuric acid. After concentration, the precipitate was filtered off and dried. The resulting solid was suspended in 90 percent aqueous isopropanol and triethylamine was added until the pH was 5.8. The solid material was fitered off and stirred with diethyl ether to obtain 1.1 g of crystalline 6-(α-aminophenylacetamido)-penicillanic acid sulphoxide (confirmed by NMR).

Various modifications of the process and products of the invention may be made without departing from the spirit or scope thereof and it is to be understood that the invention is to be limited only as defined in the appended claims.

I claim:

1. In the process for the preparation of 7β-acylamido-3-methyl-ceph-3-em-4-carboxylic acid compounds by heating between 50° and 160° C. the corresponding 6β-acylamidopenicillanic sulfoxide, ester or amide, the improvement comprising conducting the heating under anhydrous conditions in the presence of at least 10 moles of a nitrogen containing organic base with a pKa (in water) between 4 and 10 per mole of penicillanic sulfoxide and a silicon-halogen compound of the formula

wherein $Y_1$, $Y_2$, and $Y_3$ are individually selected from the group consisting halogen, alkyl of 1 to 4 carton atoms optionally substituted by halogen, phenyl and phenylalkyl having one to two alkyl carbon atoms and X is halogen.

2. The process of claim 1 wherein the acylamido group is selected from the group consisting of phenylacetamido, phenoxyacetamido, α-(benzyloxycarbamoyl)-phenylacetamido and 2-ethoxynaphthamido, and when the grouping is α-benzyloxycarbamoyl-phenylacetamido removing from the resulting desacetoxycephalosporanic acid product the benzyloxycarbonyl group on the amino radical.

3. The process of claim 1 wherein the 6β-penicillanic sulfoxide is present in the acid form or its lower alkyl, benzyl and benzhydryl ester.

4. The process of claim 1 in which the temperature is between 60° and 130°C.

5. The process of claim 1 in which the temperature is from 70° to 100°C.

6. The process of claim 1 in which the nitrogen containing base is selected from the group consisting of hexamethylenetetramine, N-methyl-aniline, dimethylaniline, pyridine and pyridine substituted with at least one member selected from the group consisting of lower alkyl, mono and di(lower) alkylamino, a collidine and quinoline.

7. The process of claim 1 wherein the nitrogen-containing base is selected from the group consisting of a picoline, 2-ethylpyridine, 2-propylpyridine, 2,3-dimethylpyridine and 2,6-dimethylpyridine.

8. The process of claim 1 wherein the nitrogen-containing base is selected from the group consisting of α-picoline, 2,5-dimethylpyridine, 2-dimethylaminopyridine and 3-methylisoquinoline.

9. The process of claim 1 wherein the amount of nitrogen-containing base is 10 to 70 moles for each mole of penicillanic sulphoxide.

10. The process of claim 1 in which X is chlorine.

11. The process of claim 1 in which the silicon-halogen compound is selected from the group consisting of triethylchlorosilane, methyltrichlorosilane, trimethylbromosilane, tri-n-propylchlorosilane, triethylbromosilane, tri-n-propyl-bromo silane, bromomethyl-dimethylchlorosilane, tri-n-butyl-chlorosilane, methyldiethylchlorosilane, dimethylethylchlorosilane, phenyldimethylbromosilane, benzylmethylethylchlorosilane, phenylethylmethylchlorosilane, triphenylchlorosilane, tri-o-tolyl-chlorosilane and tri-p-dimethylaminophenyl-chlorosilane.

12. The process of claim 1 wherein the silicon-halogen compound is selected from the group consisting of trimethylchlorosilane and dimethyldichlorosilane.

13. The process of claim 1, in which the silicon-halogen compound is present in molar excess in relation to the penicillanic sulphoxide.

14. The process of claim 13 in which 3 to 15 moles of silicon-halogen compound is present per mole of penicillanic sulphoxide.

15. The process of claim 1 wherein the reaction is effected in an inert organic solvent.

16. The process of claim 15 in which the organic solvent is benzyl cyanide or a haloalkane.

17. The process of claim 16 in which the halo alkane is selected from the group consisting of 1,2-dichloroethane, 1,1-dichloroethane, 1-bromo-1-chloroethane, 1,2,3-trichloropropane and chloroform.

18. The process of claim 15 wherein the solvent is selected from the group consisting of benzyl cyanide, 1,2-dichloroethane, 1-bromo-1-chloroethane and chloroform and the base is selected from the group consisting of $\alpha$-picoline and 2,5-dimethylpyridine.

* * * * *

UNITED STATES PATENT OFFICE
CERTIFICATE OF CORRECTION

Patent No. 3,852,281         Dated Dec. 3, 1974

Inventor(s) JAN VERWEIJ

It is certified that error appears in the above-identified patent and that said Letters Patent are hereby corrected as shown below:

| Patent Col. | Line | Appln Page | Line | |
|---|---|---|---|---|
| 1 | | | | Under Assignee "Gis-en Spritus" should be --Gist-en Spiritus-- |
| 1 | 10 | 1 | 13 | "condtions" should be --conditions-- |
| 4 | 43&44 | 7 | 13 | "preferably chlorine)" should be --(preferably chlorine)-- |

UNITED STATES PATENT OFFICE
CERTIFICATE OF CORRECTION

Patent No. 3,852,281   Dated Dec. 3, 1974

Inventor(s)  JAN VERWEIJ

It is certified that error appears in the above-identified patent and that said Letters Patent are hereby corrected as shown below:

| Patent | | Appln | | |
|---|---|---|---|---|
| Col. | Line | Page | Line | |
| 4 | 48 | 7 | 17&18 | "trin-propyl" should be --tri-n-propyl-- |
| 9 | 50 | 17 | 10 | "(d,J=5Hz, 1)" should be --(d,J=5 Hz, 1)-- |

Signed and sealed this 1st day of April 1975.

(SEAL)
Attest:

RUTH C. MASON
Attesting Officer

C. MARSHALL DANN
Commissioner of Patents
and Trademarks